United States Patent [19]

Bacardit

[11] Patent Number: 4,527,591
[45] Date of Patent: Jul. 9, 1985

[54] HYDRAULIC ROTARY DISTRIBUTOR WITH A STAR-SHAPED ROTOR, MORE PARTICULARLY FOR A POWER-ASSISTED STEERING MECHANISM

[75] Inventor: Juan S. Bacardit, Barcelona, Spain

[73] Assignee: Bendiberica S.A., Barcelona, Spain

[21] Appl. No.: 490,808

[22] Filed: May 2, 1983

[30] Foreign Application Priority Data

May 26, 1982 [FR] France .................................. 82 09134

[51] Int. Cl.³ ........................ F15B 9/10; F15B 13/04; F16K 11/02
[52] U.S. Cl. .............................. 137/625.21; 91/375 R; 91/467
[58] Field of Search ................. 91/375 R, 375 A, 467; 137/625.21; 251/208, 209

[56] References Cited

U.S. PATENT DOCUMENTS

| | | | |
|---|---|---|---|
| 2,058,890 | 10/1936 | Keen | 91/467 |
| 2,917,079 | 12/1959 | Verbrugge et al. | 137/625.14 |
| 4,217,932 | 8/1980 | Bacardit | 91/467 |
| 4,434,706 | 3/1984 | Bertin | 91/467 |
| 4,442,755 | 4/1984 | Rozycki | 137/625.21 |

FOREIGN PATENT DOCUMENTS

| | | |
|---|---|---|
| 0004212 | 2/1979 | European Pat. Off. . |
| 0008252 | 2/1980 | European Pat. Off. . |
| 2753185 | 6/1978 | Fed. Rep. of Germany ... 91/375 A |
| 2486896 | 1/1982 | France . |
| 2486897 | 1/1982 | France . |
| 42731 | 4/1979 | Japan ......................... 91/375 A |

*Primary Examiner*—Irwin C. Cohen
*Attorney, Agent, or Firm*—Larry J. Palguta; Ken C. Decker

[57] ABSTRACT

The star-shaped rotor (10) accommodated in a discoid cavity (9) defines first chambers (27) formed in the arms (20) of the rotor and second chambers (26) for receiving fluid under pressure delimited between two adjacent arms of the rotor, the constitutive elements of the stator (3-5) being joined together by fastening means (50) extending through the second chambers (26), the lateral faces of the cavity opposite the stator incorporating passage apertures (32', 33) which have a trapezoidal profile with radial edges coincide substantially with the web zones (31) of the arms of the rotor, the edges of which define with the edges of the apertures adjustable restrictions (250, 280) the first chambers (27) communicating permanently with return passages (38) in the stator.

5 Claims, 5 Drawing Figures

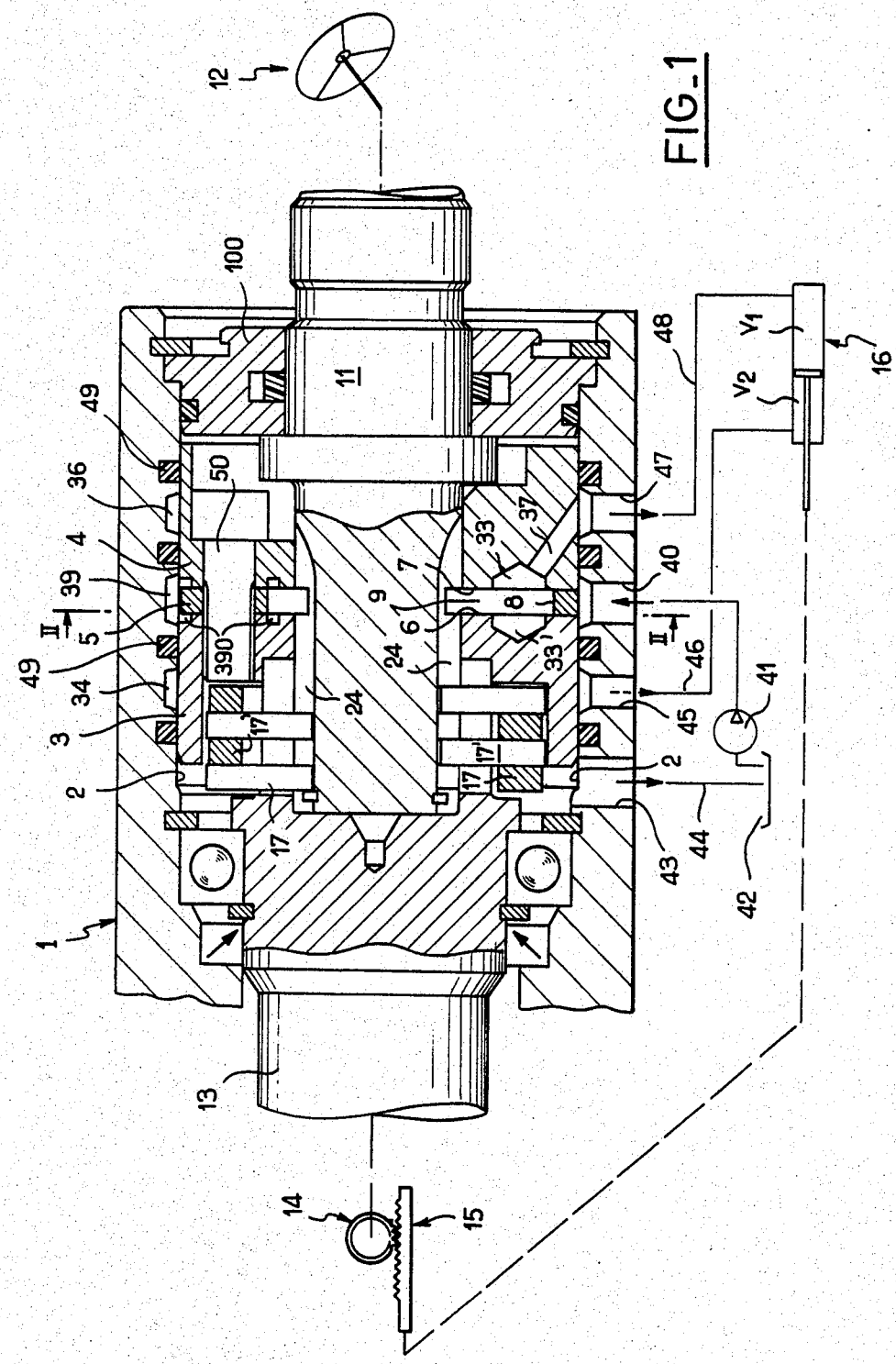
FIG_1

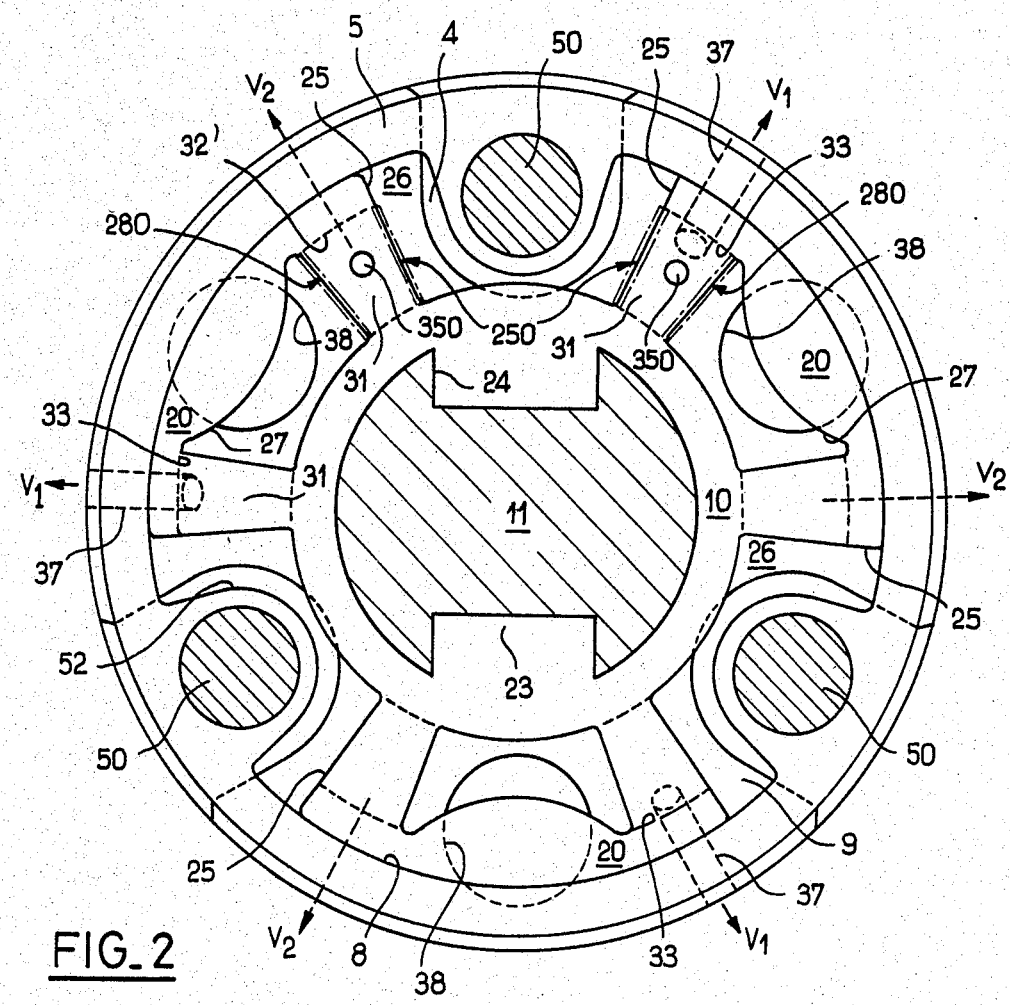
FIG_2
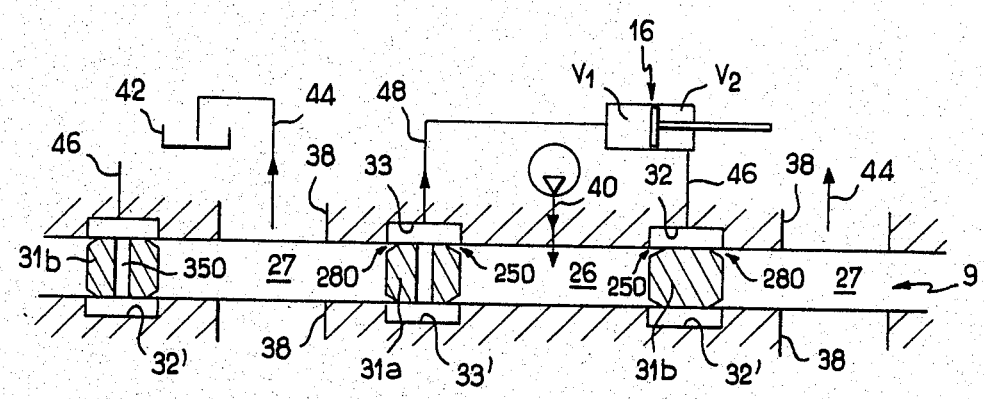
FIG_5

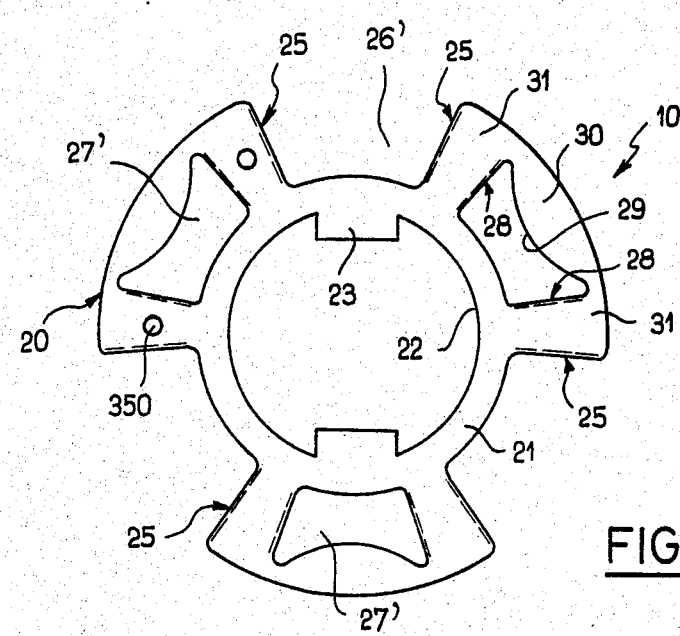
FIG_3
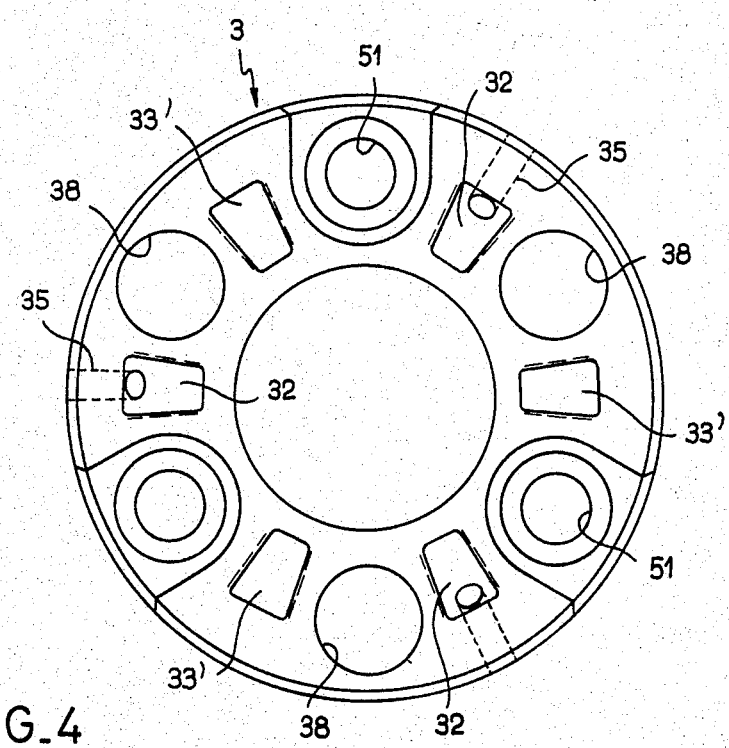
FIG_4

HYDRAULIC ROTARY DISTRIBUTOR WITH A STAR-SHAPED ROTOR, MORE PARTICULARLY FOR A POWER-ASSISTED STEERING MECHANISM

The present invention relates to rotary hydraulic distributors for hydraulic actuating systems, more particularly for power-assisted steering mechanisms of motor vehicles.

The present invention relates more particularly to rotary hydraulic distributors of the type comprising a first rotary valve member fixed in rotation to an input shaft, and a second rotary valve member fixed in rotation to an output shaft, the two rotary valve members cooperating mutually so as to form selectively fluid flow paths between a source of fluid under pressure and the respective compartments of a hydraulic power-assistance motor as a function of the relative angular position of these two members, the second of these members being rotatably mounted in a bore in a housing and defining a discoid cavity, which is delimited by lateral walls and a peripheral wall, which receives completely the first member which consists of a star-shaped rotor, the radial arms of which delimit at least two series of angularly offset chambers capable of communicating selectively with fluid passages formed in the second member and opening into the discoid cavity. Such a hydraulic rotary distributor is described, in particular, in French Patent Application No. 2 372 065 in the applicant's name.

In this type of distributor, the valve member, which is fixed to the output shaft and is generally referred to as a stator in contrast to the rotor forming the first valve member, is constructed by joining together coaxially at least two annular elements, the opposing end faces of which define the lateral walls of the discoid cavity, usually with a third annular element forming a spacer between the two end elements and defining the peripheral wall of the discoid cavity. These various elements are fixed by means of screws or bolts extending axially and distributed angularly round the common axis of the two means, and, to prevent these joining means from passing through the discoid chamber in which the rotor is received hermetically and to avoid the attendant problems, this implies that the second valve member is made oversized radially so as to provide a peripheral ring portion surrounding the discoid cavity and allowing the passage of said joining means. On the other hand, this type of distributor presents problems of leak-proofing between the various chambers defined in the discoid cavity by the arms of the rotor, more particularly at the interface of sliding contact between the peripheral wall of the cavity and the arms which delimit the working chambers receiving the fluid under pressure coming directly from the source of fluid under pressure. Finally, in known distributors of this type, the fluid under pressure coming from the source is admitted via orifices which open into the discoid cavity and which are formed in the axially facing walls of the components forming the stator, and which, at rest, coincide with arms of the rotor, with the accompanying disadvantages regarding the arrangement of the circuits for conveying fluid under pressure so as to make the various admission orifices in the stator communicate with one another.

An object of the present invention is to overcome these drawbacks of previous distributors by proposing a rotary distributor of the type defined above, allowing a considerable reduction in diameter of the distributor, and to eliminate problems of peripheral leak-proofing or of maintaining high radial accuracy for the rotor, while largely simplifying the realization of the fluid delivery ducts, in a simple arrangement which involves low production costs and which can easily be made in large quantities and has increased operating reliability.

For this purpose, according to a feature of the present invention, in an hydraulic rotary distributor of the type defined above, the chambers of a first of the series of chambers are formed in the arms of the rotor, being delimited laterally by the facing lateral walls of the discoid cavity, the chambers of the second series of chambers being delimited between two adjacent arms of the rotor by the facing lateral walls and the peripheral wall of the discoid cavity, the second rotary member (or stator) incorporating an inlet passage for delivery of fluid under pressure, communicating permanently with the chambers (admission or inlet chambers) of the second series of chambers, the distributor incorporating fluid distribution circuits intended to be connected respectively to the compartments of the power-assistance motor and which open into the discoid cavity via first and second apertures formed in the axially opposing or facing lateral walls of the cavity in line with web portions of the arms separating a chamber of the first series of chambers from the adjacent chambers of the second series of chambers, and fluid return passages communicating permanently with the chambers of the first series of chambers of the rotor.

According to another feature of the invention, the second member is constructed by joining together coaxially at least two annular elements, the opposing inner faces of which form the lateral walls of the discoid cavity, these two annular elements being joined together by fastening means extending axially in the chambers of the second series of chambers of the distributor.

In such an arrangement, the chambers of the first series of chambers are formed in the arms of the rotor, the chambers of the second series of chambers being directly fed radially with fluid under pressure and thus being able to intercommunicate without difficulty as a result of a possible play existing between the outer periphery of the arms of the rotor and the peripheral wall of the discoid cavity, thereby simplifying, in the second member or stator, the arrangement of the ducts for conveying fluid under pressure.

Other characteristics and advantages of the present invention will emerge from the following description of a preferred embodiment which is given by way of illustration but is in no way limiting, this description being made in relation to the attached drawings in which:

FIG. 1 is a diagrammatic axial section through a hydraulic rotary distributor, according to the invention, which is incorporated in a power-assisted steering mechanism;

FIG. 2 is a diagrammatic cross-sectional view along the line II—II of FIG. 1;

FIG. 3 is a plan view of the rotor of FIG. 2;

FIG. 4 is a view of the inner face of one of the two annular end elements forming the second member or stator of the distributor of FIGS. 1 and 2; and FIG. 5 is a developed diagrammatic representation of the distributor of FIGS. 1 and 2.

FIG. 1 shows one end of a casing 1 of a power-assisted steering mechanism, within which is defined an axial bore 2 in which the stator of a hydraulic distributor according to the present invention is mounted rotatably. This stator is constructed by joining together coaxially a first annular end piece 3 and a second annular end piece 4, between which an intermediate annular piece 5 forming a spacer is secured, the axially opposing or facing faces 6 and 7 of the annular end pieces 3 and 4 respectively and the inner peripheral wall 8 of the intermediate piece 5 defining a substantially discoid cavity 9 in which a rotor 10, which can be seen in FIGS. 2 and 3 but is not shown in FIG. 1, is rotatably mounted to slide by means of its lateral faces.

In a way known in the art, the rotor 10 is fixed in rotation to an input shaft 11, typically connected, in the example illustrated, to a steering wheel 12, the stator 3–5 being connected to an output shaft 13 which actuates, for example, a pinion 14 engaging with a rack 15 of a mechanism for steeriing the directional wheels of a vehicle, the displacement of the rack 15 being assisted by a hydraulic jack 16 of the double-acting type. The input shaft 11 and the rotor 10 can rotate freely by a small determined angular value in relation to the unit consisting of the stator 3–5 and the output shaft 13, and the angular displacement of the shaft 11 beyond this specific range also causes the rotation of the output shaft 13 and the stator 3–5 coupled to it. In the example illustrated in FIG. 1, this angular lost-motion coupling with centering return is carried out by at least one pair of C shaped springs 17, 17' according to an arrangement described in Spanish Patent Application No. 506,793 filed on 14th Oct. 1981 in the applicant's name. Alternatively, in a way also known per se, flexible angular lost-motion coupling between the input shaft 11 and the output shaft 13 can be carried out by a torsion bar which extends in an axial bore formed in the input shaft 11 and the ends of which are connected respectively to the input shaft 11 and the output shaft 13.

As may be seen better in FIGS. 2 and 3, according to the invention, the rotor 10 is of the type called star-shaped, with three arms 20 (or more) extending radially outwards from an annular hub zone 21 incorporating a central orifice 22 through which the inner end of the shaft 11 extends, the rotor and the shaft 11 being fixed in rotation to one another by teeth 23 which project radially inwards into the orifice 22 and are received in corresponding grooves 24 in the shaft 11. The arms 20 of the rotor 10 are delimited laterally by first radial closing edges 25. Two first adjacent closing edges 25 thus define between them a space 26' which, when the rotor is mounted in the discoid cavity 9, will constitute said second chambers 26 delimited by the axially facing walls 6 and 7 and the peripheral wall 8 of the discoid cavity 9. The outer periphery of the arms 20 is circumscribed by a circle which has a diameter slightly less than that of the inner wall 8 of the intermediate annular element 5 of the stator. A cut-out 27' is made in each arm 20 which when the rotor is arranged in the cavity 9, forms a chamber 27 of a first series of chambers delimited laterally by the facing walls 6 and 7 of the cavity 9; each cut-out 27' is defined laterally by two second radial closing edges 28 and externally by a curved edge 29 having a convexity directed radially inwards, thus making it possible to provide a widened peripheral central zone 30 for each arm, while presenting a suitable useful radial length extension for the second inner closing edges 28. The closing edges 25 and 28 thus provide, on either side of each cut-out 27', a solid web portion 31 of substantially trapezoidal shape. In the assembled arrangement, in the neutral or rest position illustrated in FIG. 2, these web portions of the arms 20 substantially coincide, by overlapping, with apertures having an identical trapezoidal profile 32 and 33 which are distributed angularly respectively in the faces 6 and 7 of the annular end pices 3 and 4 of the stator. More precisely, as may be seen in FIG. 4, the face 6 of the annular piece 3 incorporates three passage apertures 32 communicating with a peripheral groove 34 formed in the casing 1 by means of ducts 35 extending outwards. In the same way, the face 7 of the annular piece 4 incorporates three passage apertures 33 offset angularly in relation to the apertures 32 and communicating with a peripheral groove 36 formed in the casing 1 via outwardly extending ducts 37. In practice, for the purpose of axial hydraulic balancing, the web portions 31 of the arms 20 of the rotor 10 are provided with axial throughholes 350, and facing each aperture 32 or 33 in one face 6 or 7 a corresponding but blind aperture 32' and 33' respectively is made in the opposite face 7 or 6. Furthermore, located in each annular piece element 3 or 4 and between two opening and blind apertures 32 and 33' and 32' is an axial through-passage or bore 38 which opens into the corresponding lateral wall 6 or 7 of the cavity 9 and which communicates with the inner chamber of the casing 1 formed by the bore 2. As may be seen in FIG. 1, an annular peripheral groove 39 is also formed in the inner peripheral wall of the casing 1 round the intermediate annular piece 5 and communicating freely with the discoid cavity 9 via radial ducts 390. Moreover, this groove 39 communicates, via a passage 40 formed in the casing 1, with a source of fluid under pressure, in this particular case a pump 41 which draws the working liquid from a tank 42. The interior of the bore 2 communicates, via a passage 43 formed in the casing 1, with a return line 44 to the tank 42. The groove 34 communicates, via a passage 45 formed in the body of the casing 1, with a line 46 connected to a compartment V2 of the jack 16, while the groove 36 communicates, via a passage 47 formed in the body of the casing 1, with a line 48 connected to the other compartment V1 of the jack 16. The different grooves 34, 39 and 36, offset axially relative to one another, are isolated from one another by annular gaskets such as 49.

In the assembled configuration illustrated in FIGS. 1 and 2, it can be seen that the axial passages 38 are dimensioned so as to communicate permanently and largely with the first chambers 27 formed in the arms 30 of the rotor 10. Likewise, the second chambers 26 formed between two adjacent arms of the rotor communicate permanently with the pressure source 41 via the groove 39. According to one object of the invention, this arrangement makes it possible to join together the pieces 3–5 constituting the stator by means of bolts 50 extending axially through the second chambers 26 between two arms of the rotor, the bolts 50 thus being inscribed in the peripheral circle of the rotor 10. In line with the bolts 50, the annular end pieces 3 and 4 are advantageously provided with a boss 51, and likewise the intermediate piece 5 is provided with inwardly extending radial lugs 52 which are received in the first chambers 26 and which can serve as an angular stop for the rotational displacement of the rotor 10.

The device oprates as follows:

In the neutral or rest position shown in FIG. 2, the various apertures 32 and 33 are substantially concealed or dimmed by the web portions 31 of the rotor, the edges of which are chamfered to form controlled fluid-passage restrictions 250 and 280 between the second (inlet) chambers 26 and the working apertures 32 and 33 and from the latter towards the first (outlet) chambers 27. In the position of rest, the fluid under pressure in the chambers 26 flows symmetrically via the inlet restrictions 250 into the apertures 32 and 33 and from the latter via the outlet restrictions 280 into the first chambers 27, and then, via the passages 38, flows back towards the tank 42 in an operation of the so-called "open-center" type. In contrast to this, as soon as the rotor is displaced angularly in one direction in relation to the stator, there arises a differential fluid flow passage variation between the symmetric inlet restrictions 250, causing an increse in pressure in one of the passage apertures 32 or 33 in relation to the fluid pressure in the other passage aperture 33 or 32, thus casing the jack 16 to be displaced correlatively so as to assist the steering system of the vehicle, the situation being exactly reversed when the rotor is actuated to rotate in the opposite direction, as is well known in the art.

Preferably, the chambers of the closing edges 25 and 28 interacting with the adjacent edges of the passage apertures 32 and 33, as also, if appropriate, these edges of the passage apertures, have a developing profile which delimits, between the interacting adjacent edges of the valve members, a fluid flow passage having, for each relative angular position of these members, an identical width over the entire radial length extension of the passage, as disclosed in French Patent Application No. 82-09133 to the applicant, the content of which is assumed to be included here for reference.

Although the present invention has been described in relation to a particular embodiment, it is not limited thereby, but on the contrary is capable of modifications and alternative forms which will appear to a person skilled in the art. Thus, the invention could apply equally to a power-assisted steering device of the "closed-center" type, in which case the web portions 31 of the rotor overlap e.g. close the apertures 32 and 33 of the stator completely in the rest position. Likewise, the above-described hydralic distributor can be employed, with suitable modifications to details, in other uses where equivalent operating conditions are encountered, for example for controlling machine tools and similar equipment.

I claim:

1. A hydraulic rotary distributor, more particularly for a power assisted steering mechanism, which comprises:
   a housing having an axial bore;
   a first rotary discoidal star-shaped valve member comprising a rotor fixed in rotation to an input shaft and having angularly spaced radial arms;
   a second rotary valve member fixed in rotation to an output shaft and mounted for rotation within said bore, said second valve member being constructed by joining coaxially at least a first annular element and a second annular element with an intermediate annular spacer element therebetween, said annular elements defining an inner discoid cavity having facing lateral walls and a peripheral wall within which is totally received in rotatable sliding sealing relationship the first valve member to define within said cavity at least two series of angularly offset chambers arranged to communicate selectively, upon relative rotational displacement of the first and second valve members, with fluid passages formed in said second valve member and opening into said cavity for establishing selectively fluid flow paths between a sorce of fluid under pressure and respective compartments of a hydraulic power-assistance motor, wherein the chambers of a first of said series of angularly offset chambers are formed in each of said arms of said rotor and each being delimited axially by said facing lateral walls of said cavity and angularly by radial edge web portions of the associated arm, the chambers of a second of said series of angularly offset chambers each being delimited between two adjacent first chambered arms of said rotor by said facing lateral walls and said peripheral wall of said cavity, said fluid passages including an inlet passage surrounding peripherally said annular spacer element and communicating permanently with said second chambers, distribution passages communicating respectively with first and second apertures each formed in a mirrorlike fashion in said facing lateral walls of said cavity and in line with and of substantially the same radial extent as said web portions of said arms, and return passages comprising axial bores extending through said second valve member and opening in said cavity on both sides axially of said first valve member and in permanent fluid communication with said first chambers formed in said arms, said annular elements of said second valve member being joined by fastening means each extending axially through a respective chamber of said second series of angularly offset chambers, said first series of chambers each having a wide radially outer curved edge with a profile having a convexity directed toward the axis of the rotor, the curved edges being positioned to partially close the associated return passages.

2. The hydraulic distributor according to claim 1, characterized in that said distribution passages open at the outer periphery of said second valve member and into axially separated annular grooves formed in said bore of said housing.

3. The hydraulic distributor according to claim 1, characterized in that said first apertures and second apertures each have a contour which coincides with that of the associated web portions of the arms of said first valve member.

4. The hydraulic distributor according to claim 3, characterized in that said first apertures, second apertures, and web portions of the arms each have substantially straight radial edges.

5. The hydraulic distributor according to claim 2, characterized in that said return passages consist of axial bores extending through said second valve member.

* * * * *